United States Patent
Lee et al.

(10) Patent No.: US 12,159,031 B2
(45) Date of Patent: Dec. 3, 2024

(54) METHOD AND APPARATUS FOR RETURNING MEMORY

(71) Applicant: SAMSUNG ELECTRONICS CO., LTD., Suwon-si (KR)

(72) Inventors: Jungseung Lee, Suwon-si (KR); Huijin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 17/943,901

(22) Filed: Sep. 13, 2022

(65) Prior Publication Data

US 2023/0168807 A1    Jun. 1, 2023

Related U.S. Application Data

(63) Continuation of application No. PCT/KR2022/013109, filed on Sep. 1, 2022.

(30) Foreign Application Priority Data

Nov. 30, 2021    (KR) .......................... 10-2021-0167833

(51) Int. Cl.
*G06F 3/06* (2006.01)

(52) U.S. Cl.
CPC .......... *G06F 3/0608* (2013.01); *G06F 3/0653* (2013.01); *G06F 3/0673* (2013.01)

(58) Field of Classification Search
CPC .... G06F 3/0608; G06F 3/0653; G06F 3/0673; G06F 3/06; G06F 2209/5019;

(Continued)

(56) References Cited

U.S. PATENT DOCUMENTS

| | | | |
|---|---|---|---|
| 10,802,765 B2 * | 10/2020 | Mangione-Tran | .... G06F 3/0608 |
| 11,762,860 B1 * | 9/2023 | Rahman | ............ G06F 16/24539 707/769 |

(Continued)

FOREIGN PATENT DOCUMENTS

| | | |
|---|---|---|
| CN | 111880991 A | 11/2020 |
| CN | 112948073 A | 6/2021 |

(Continued)

OTHER PUBLICATIONS

International Search Report (PCT/ISA/210) dated Dec. 9, 2022 issued by the International Searching Authority in International Application No. PCT/KR2022/013109.

(Continued)

*Primary Examiner* — Zhuo H Li
(74) *Attorney, Agent, or Firm* — Sughrue Mion, PLLC

(57) ABSTRACT

An electronic device includes a display; a memory configured to store at least one instruction corresponding to at least one program; and a processor configured to execute the at least one instruction as a process, wherein the processor is configured to: predict, in response to a foreground execution of a first process, an amount of an available memory at a time point after an elapse of a predetermined time from the foreground execution of the first process, based on memory usage information stored in the memory; based on the predicted amount of the available memory exceeding a predetermined threshold value, suspend a memory return operation for the predetermined time; and based on the predicted amount of the available memory being less than the predetermined threshold value, perform the memory return operation without suspending the memory return operation.

18 Claims, 7 Drawing Sheets

(58) Field of Classification Search
CPC .... G06F 3/0632; G06F 3/0659; G06F 9/5016; G06F 9/5022; G06F 13/18; G06F 3/0604; G06F 3/0631
See application file for complete search history.

(56) References Cited

U.S. PATENT DOCUMENTS

| | | |
|---|---|---|
| 2010/0122247 A1 | 5/2010 | Ikeda |
| 2012/0102504 A1 | 4/2012 | Iyer et al. |
| 2015/0067238 A1 | 3/2015 | Marcu et al. |
| 2015/0254108 A1* | 9/2015 | Kurtzman ............ G06F 9/5016 718/104 |
| 2015/0256476 A1 | 9/2015 | Kurtzman et al. |
| 2016/0088988 A1 | 3/2016 | Eo et al. |
| 2018/0102981 A1 | 4/2018 | Kurtzman et al. |
| 2019/0335967 A1 | 11/2019 | Wolff et al. |
| 2023/0036737 A1* | 2/2023 | Carbon-Ogden .... G06N 3/0475 |
| 2023/0148812 A1 | 5/2023 | Yang et al. |

FOREIGN PATENT DOCUMENTS

| | | |
|---|---|---|
| EP | 3514683 B1 | 8/2021 |
| JP | 2010-117838 A | 5/2010 |
| KR | 10-2012-0139541 A | 12/2012 |
| KR | 10-2013-0127445 A | 11/2013 |
| KR | 10-2016-0132432 A | 11/2016 |
| KR | 10-1908732 B1 | 10/2018 |
| KR | 10-2091409 B1 | 3/2020 |
| KR | 10-2020-0074055 A | 6/2020 |
| KR | 10-2021-0128783 A | 10/2021 |
| WO | 2012/177579 A1 | 12/2012 |

OTHER PUBLICATIONS

Written Opinion (PCT/ISA/237) dated Dec. 9, 2022 issued by the International Searching Authority in International Application No. PCT/KR2022/013109.

Anonymous, "Paging", Wikipedia, the free encyclopedia, 2016, pp. 1-11 (11 pages total).

Extended European Search Report dated Oct. 8, 2024, issued by the European Patent Office in European Application No. 22901515.1.

* cited by examiner

FIG. 5

PROCESSES SORTED IN A
PREDETERMINED PRIORITY

| PROCESS A |
| PROCESS B |
| PROCESS C |
| PROCESS D |
| PROCESS E |

⁎
⁎
⁎

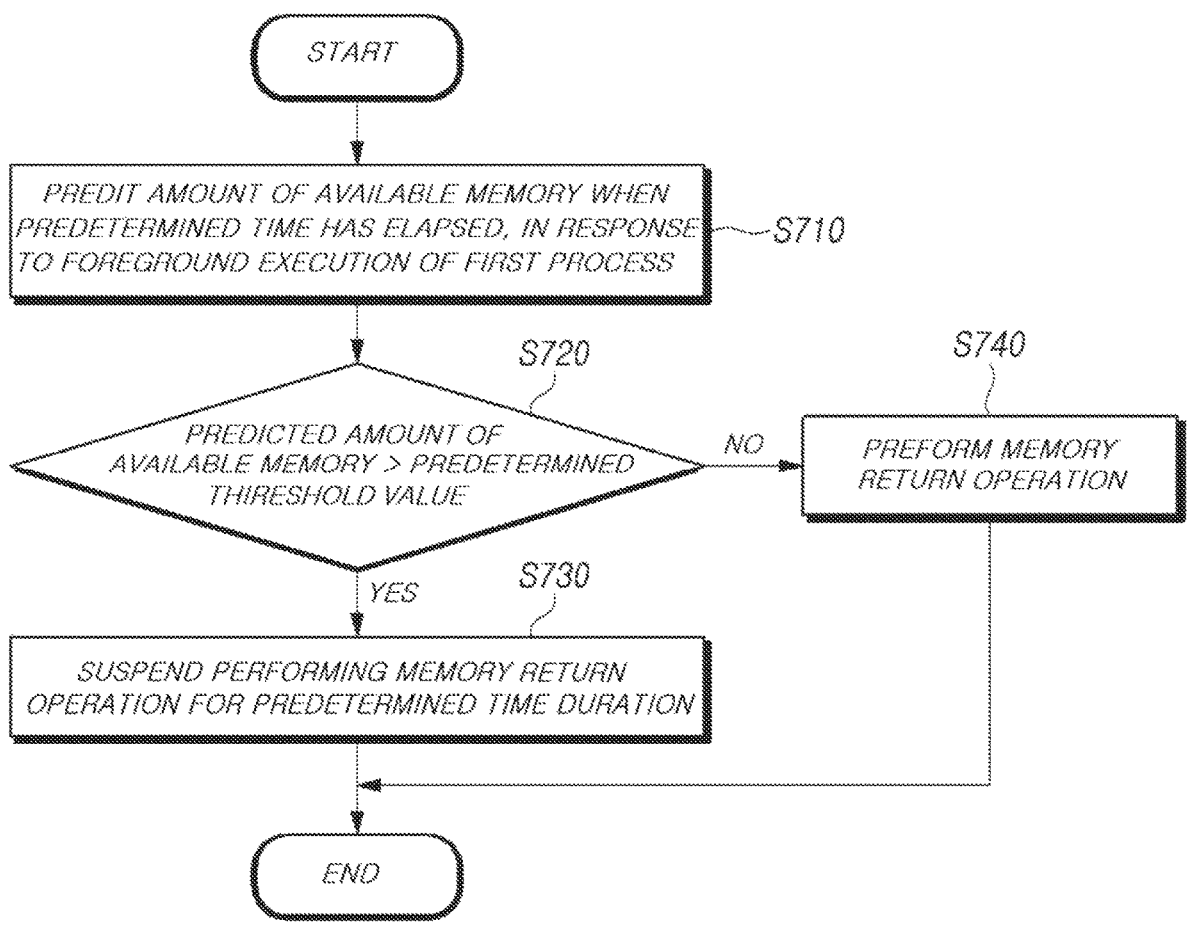

METHOD AND APPARATUS FOR RETURNING MEMORY

CROSS REFERENCE TO RELATED APPLICATIONS

This application is a continuation application of International Application No. PCT/KR2022/013109 designating the United States, filed on Sep. 1, 2022, in the Korean Intellectual Property Receiving Office, which claims priority from Korean Patent Application No. 10-2021-0167833, filed on Nov. 30, 2021, in the Korean Intellectual Property Office, the disclosures of which are hereby incorporated by reference herein in their entireties.

BACKGROUND

1. Field

Various embodiments of the present disclosure relate to a memory return method and apparatus for selectively returning memory by predicting the amount of available memory at a time point when a predetermined time has elapsed, based on memory usage information, in response to a foreground execution of an application process.

2. Description of Related Art

Since an electronic device may fall into an unrecoverable state in the worst case if the minimum memory required for its operation is not secured, the electronic device may operate to periodically monitor an available memory, and if necessary, perform a memory return operation for the memory in use. The electronic device may perform such a memory return operation for the memories used by application/service programs, a kernel which is resident in its memory as part of an operating system (OS), and so on.

The memory return operation may be performed with a memory re-allocation (reclaim) or a process termination (kill). When an available memory in a system is insufficient (that is, when it is below a predetermined threshold value), the memory return operation with process termination may force a process with a relatively lower priority among a plurality of processes in execution to be terminated, thereby returning the memory used by execution of the corresponding process. The memory return operation with memory re-allocation makes it possible to return the memory by selecting the memory to be reclaimed while maintaining the process execution and swapping out a content of the selected memory into a swap medium (or device).

When an electronic device operates to determine whether there is insufficient available memory on the basis of a certain threshold value pre-set as a fixed value, without predicting a future memory usage condition, and terminate a process in execution, any available memory may be immediately obtained, but the overhead of execution costs such as e.g., an initialization process to re-execute the terminated process thereafter may be high, and a user's application usability may decline. Thus, even if the execution of the corresponding process is maintained and the available memory is obtained through the memory reallocation, usage of a CPU and a swap medium will increase to process selection of memory to be reclaimed and swapping-out of the memory, which in turn may lead to reduced usability of the electronic device.

SUMMARY

Various embodiments of the present disclosure provide a memory return method and apparatus for selectively returning memory by predicting the amount of available memory at a time point when a predetermined time has elapsed, based on memory usage information, in response to a foreground execution of an application process.

According to an aspect of an example embodiment of the present disclosure, provided is an electronic device including: a display: a memory configured to store at least one instruction corresponding to at least one program; and a processor configured to execute the at least one instruction as a process, wherein the processor is configured to: predict, in response to a foreground execution of a first process, an amount of an available memory at a time point after an elapse of a predetermined time from the foreground execution of the first process, based on memory usage information stored in the memory: based on the predicted amount of the available memory exceeding a predetermined threshold value, suspend a memory return operation for the predetermined time; and based on the predicted amount of the available memory being less than the predetermined threshold value, perform the memory return operation without suspending the memory return operation.

According to another aspect of an example embodiment of the present disclosure, provided is a memory return method including: predicting, in response to a foreground execution of a first process, an amount of an available memory at a time point after an elapse of a predetermined time from the foreground execution of the first process, based on memory usage information: based on the predicted amount of the available memory exceeding a predetermined threshold value, suspending a memory return operation for the predetermined time; and based on the predicted amount of the available memory being less than the predetermined threshold value, performing the memory return operation without suspending the memory return operation.

According to various embodiments of the present disclosure, the electronic device may predict the amount of available memory at a time point when a predetermined time has elapsed, based on memory usage information stored in the memory in response to the foreground execution of a process, to selectively return the memory, thereby preventing unnecessary process killing and re-execution. This in turn leads to improved application usability of its user under a multitasking environment.

Further, according to various embodiments of the present disclosure, the electronic device may prevent unnecessary memory reallocation by predicting the amount of available memory, thereby preventing usage of CPUs and swap media for selection memory to be reclaimed and its swap-out operation, which in turn leads to improved usability of the electronic device for the user.

The effects that may be obtained through exemplary embodiments of the present disclosure are not limited to those mentioned above, and other effects not mentioned herein may be clearly derived and understood by those having ordinary knowledge in the technical field to which the exemplary embodiments pertain, from the following description. In other words, any unintended effects according to carrying out the exemplary embodiments of the disclosure may be also derived by those skilled in the art from the disclosure of the exemplary embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates an example of criteria to select a process for returning memory according to an embodiment of the present disclosure;

FIG. 7 is a schematic flowchart of a memory return method according to an embodiment of the present disclosure.

DETAILED DESCRIPTION

Figure 1:
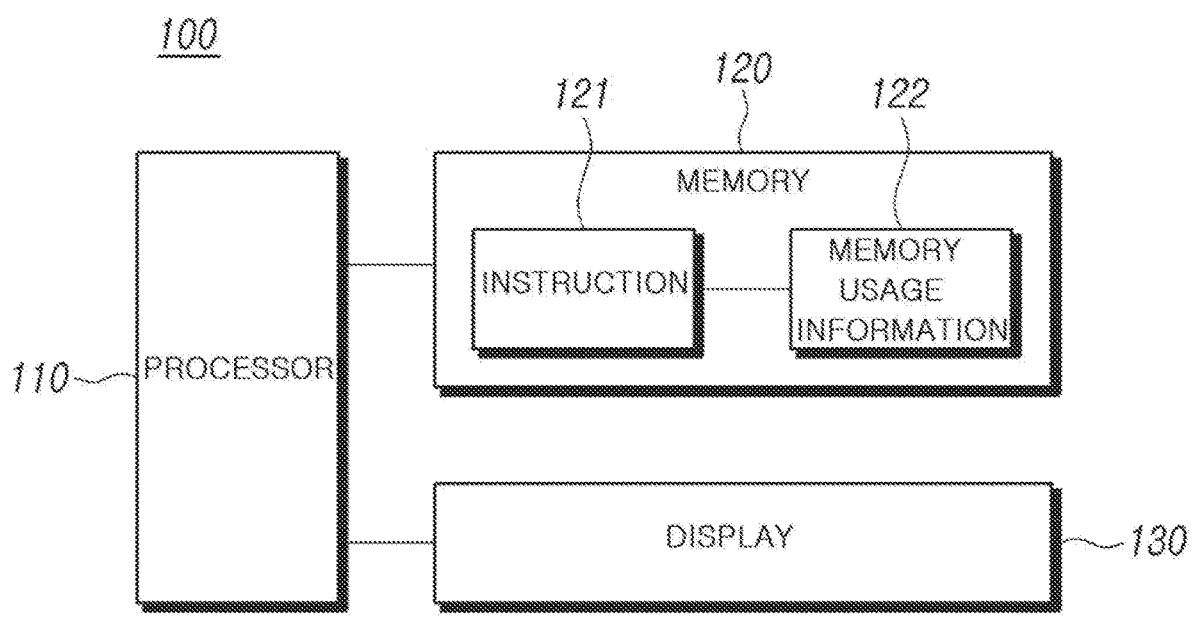
FIG. 1 is a schematic block diagram of an electronic device performing a memory return operation according to an embodiment of the present disclosure.

The terms used in various embodiments of the disclosure have been selected as general terms currently in wide use, considering various functions of the disclosure, but they may vary depending upon the intention of those skilled in the art, relevant precedents, the emergence of new technologies, and so on. Further, in a certain instance, there may be used a term arbitrarily selected by the applicant, in which case its meaning will be described in more detail in the description of the corresponding embodiment. Therefore, the term used in the disclosure should be defined based on the substantive meaning thereof and the entire contents of the disclosure, rather than a simple name of the term.

Throughout the entire specification, when it is described that an element "comprise(s)/include(s)" a certain component, it will mean that it may further include any other component(s), rather than excluding the other component(s), unless otherwise explicitly stated. Further, the terms such as e.g., " . . . unit", " . . . module" or the like described throughout the specification will mean a unit to process at least one function or operation, which may be implemented as either hardware or software, or a combination of hardware and software.

Hereinafter, with reference to the accompanying drawings, various embodiments of the disclosure will be described in detail so that those having ordinary knowledge in the technical field to which the disclosure pertains may easily implement the same. However, the disclosure may be implemented in several different forms and is not limited to the embodiments described herein. In the drawings, like reference numerals refer to like elements or components, and the dimension of each element or component in the drawings may be partially exaggerated or scaled-down/up for better clarity of description.

FIG. 1 is a schematic block diagram of an electronic device that performs a memory return operation according to an embodiment of the present disclosure.

Referring to FIG. 1, an electronic device 100 may include a processor 110, a memory 120, and a display 130. The electronic device 100 may be further configured to include any additional components in addition to the illustrated components or omit at least one of the illustrated components.

According to various embodiments, the electronic device 100 may include a terminal capable of performing computing and communication functions, and so on. The electronic device 100 may include, for example, a display device including a TV, a desktop computer, a smartphone, a notebook computer, a tablet PC, a mobile phone, a personal digital assistant (PDA), a laptop, a media player, a micro server, a global positioning system (GPS) device, an e-book terminal, a digital broadcasting terminal, a navigation system, a kiosk, an MP3 player, a digital camera, a home appliance, and other mobile or non-mobile computing devices, although it is not limited thereto. Further, the electronic device 100 may be a wearable terminal such as e.g., a watch, glasses, a hair band, and a ring capable of performing computing and communication functions. The electronic device 100 may be various types of terminals without being limited to the above description.

According to an embodiment, the memory 120 may be of a storage medium used by the electronic device 100 to store data such as e.g., at least one instruction 121 corresponding to at least one program or setting information. The program may include an operating system (OS) program and various application programs. The memory 120 may be configured as a volatile memory, a non-volatile memory, or a combination of a volatile memory and a non-volatile memory. The memory 120 may provide stored data according to a request from the processor 110.

According to an embodiment, the memory 120 may store memory usage information 122. For example, the memory usage information 122 may include, for each program, the amount of memory usage corresponding to each execution state of a process executing a program. The execution state of the process may include a foreground execution state that is in execution while outputting the process to the display 130 in the foreground and a background execution state that is in execution without outputting the process to the display 130 in the foreground. In the foreground execution state, the process may perform an interaction with a user through a user interface (not shown). When the program is executed as a process, the processor 110 may learn memory usage in response to each execution state of the process, and store memory usage information 122 including the learned memory usage in the memory 120. The processor 110 may learn the memory usage until variability in the memory usage becomes stable in each of the execution state of the process.

As another example, the memory usage information 122 may include, for each program, memory usage corresponding to an execution state of the process executing the program and an execution context. The execution state of the process may include a foreground execution state that is in execution with outputting the process to the display 130 and a background execution state that is in execution without outputting the process to the display 130. In the foreground execution state, the process may interact with a user through a user interface (not shown). The execution context may include at least one of the amount of available memory at the time of execution and the number of background processes at the time of execution. When the program is executed as a process, the processor 110 may learn memory usage corresponding to the execution state of the process and the execution context and store the memory usage information 122 including the learned memory usage in the memory 120. The processor 110 may learn the memory usage until variability in the memory usage becomes stable in each of the execution state of the process and the execution context. Accordingly, according to an embodiment, the processor 110 may learn the memory usage that may vary depending on the execution context at the time of execution as well as the execution state of the process and store the same in the memory 120.

According to an embodiment, the display 130 may perform functions for outputting information in the form of a number(s), a character(s), an image(s), and/or a graphic(s). The display 130 may include at least one hardware module for outputting information. The at least one hardware module may include, for example, at least one of Liquid Crystal Display (LCD), Light Emitting Diode (LED), Light Emitting Polymer Display (LPD), Organic Light Emitting Diode (OLED), Active-Matrix Organic Light Emitting Diode (AMOLED), FLED (Flexible LED) and so on. The display 130 may display a screen corresponding to data received from the processor 110. The display 130 may be referred to as an output module, a display module, or other terms having the equivalent technical meaning.

According to an embodiment, the processor 110 may execute at least one instruction 121 stored in the memory 120 as a process to perform an arithmetic operation or data processing in association with controlling of and/or communication with at least one other component of the electronic device 100. The processor 110 may include, for example, at least one of a central processing unit (CPU), a graphic processing unit (GPU), a microcontroller unit (MCU), a sensor hub, a supplementary processor, a communication processor, an application processor, an application specific integrated circuit (ASIC), or field programmable gate arrays (FPGA), and may have a plurality of cores.

According to an embodiment, in response to the foreground execution of a first process, the processor 110 may predict the amount of available memory when a predetermined time has elapsed (e.g., from a current time or from a time of the foreground execution), based on memory usage information 122 stored in the memory 120. The processor 110 may set a time duration until variability in the memory usage become stable, as the predetermined time, or may obtain the predetermined time based on an external input, but it would be apparent to those skilled in the art that the predetermined time may be obtained in various ways. The processor 110 may predict the amount of available memory by further considering the execution context at the time of the foreground execution in response to the foreground execution of the first process. The execution context may include at least one of the amount of available memory at the time of execution and the number of background processes at the time of execution.

According to an embodiment, when the first process is switched from the background execution to the foreground execution or the first process is newly executed in the foreground, the processor 110 may predict the amount of memory required for execution switching or new execution of the process, based on the memory usage information 122. The processor 110 may also predict the amount of required memory by further considering the execution context at the time of the foreground execution. In this context, the processor 110 may predict the amount of required memory based on the memory usage information 122 including the learned memory usage in response to the execution state of the process and the execution context.

According to an embodiment, the processor 110 may switch a second process from the foreground execution to the background execution in response to the foreground execution of the first process. The processor 110 may predict the amount of obtained memory indicative of the memory that can be obtained by the background execution of the second process, based on the memory usage information 122. The processor 110 may predict the amount of obtained memory by further considering the execution context at the time of switching to the background execution. In this context, the processor 110 may predict the amount of obtained memory based on the memory usage information 122 including the learned memory usage in response to the execution state of the process and the execution context.

According to an embodiment, the processor 110 may predict the amount of available memory by adding or subtracting the amount of obtained memory and the amount of required memory to/from the amount of current available memory, respectively. For example, the processor 110 may predict the amount of available memory by adding the amount of obtained memory to the amount of current available memory and then subtracting the amount of required memory therefrom.

According to an embodiment, when the predicted amount of available memory exceeds a predetermined threshold value, the processor 110 may suspend execution of a memory return operation for the predetermined time. When the predicted amount of available memory is less than the predetermined threshold value, the processor 110 may perform the memory return operation without suspension. The predetermined threshold value may be an amount of a reference memory that a system needs to maintain to operate the system normally without falling into an unrecoverable state, and may be pre-set based on an external input (e.g., user input), although the predetermined threshold value may be set in various manners that are apparent to those skilled in the art. A scenario in which the memory return operation is suspended will be described below with reference to FIGS. 2 and 3, and another scenario in which the memory return operation is performed will be described below with reference to FIGS. 4 to 6.

The memory return operation may include operations of selecting a process to return memory in use based on a predetermined priority and terminating (or killing) the selected process. Alternatively, the processor 110 may predict the amount of a second available memory when swapping out the memory in use to a swap medium without terminating the selected process and terminate the selected process when the predicted amount of the second available memory is less than a predetermined threshold value. The swap medium may include various types of storage media such as e.g., a hard disk, a solid-state drive (SSD) or the like, and it is apparent to those skilled in the art that the swap medium is not limited to a specific type of storage medium. Further, the swap medium may utilize a partial area of the memory 120 as a swap medium.

According to an embodiment, the processor 110 may determine whether the current amount of available memory is less than a predetermined threshold value at a certain period and perform the memory return operation when the current amount of available memory is less than the predetermined threshold value. The memory return operation may be performed through a memory reclaim or a process kill. The memory return operation with the process kill may terminate a process that is determined to have lower importance based on a predetermined priority among processes in execution, when there is insufficient available memory in the system (e.g., when the available memory is less than the predetermined threshold value), thereby returning the memory in use for the execution of a corresponding process. The memory return operation with the memory reclaim may select a memory to be reclaimed and swap out a content of the selected memory to a swap medium (or device) to reclaim the memory.

Figure 2:
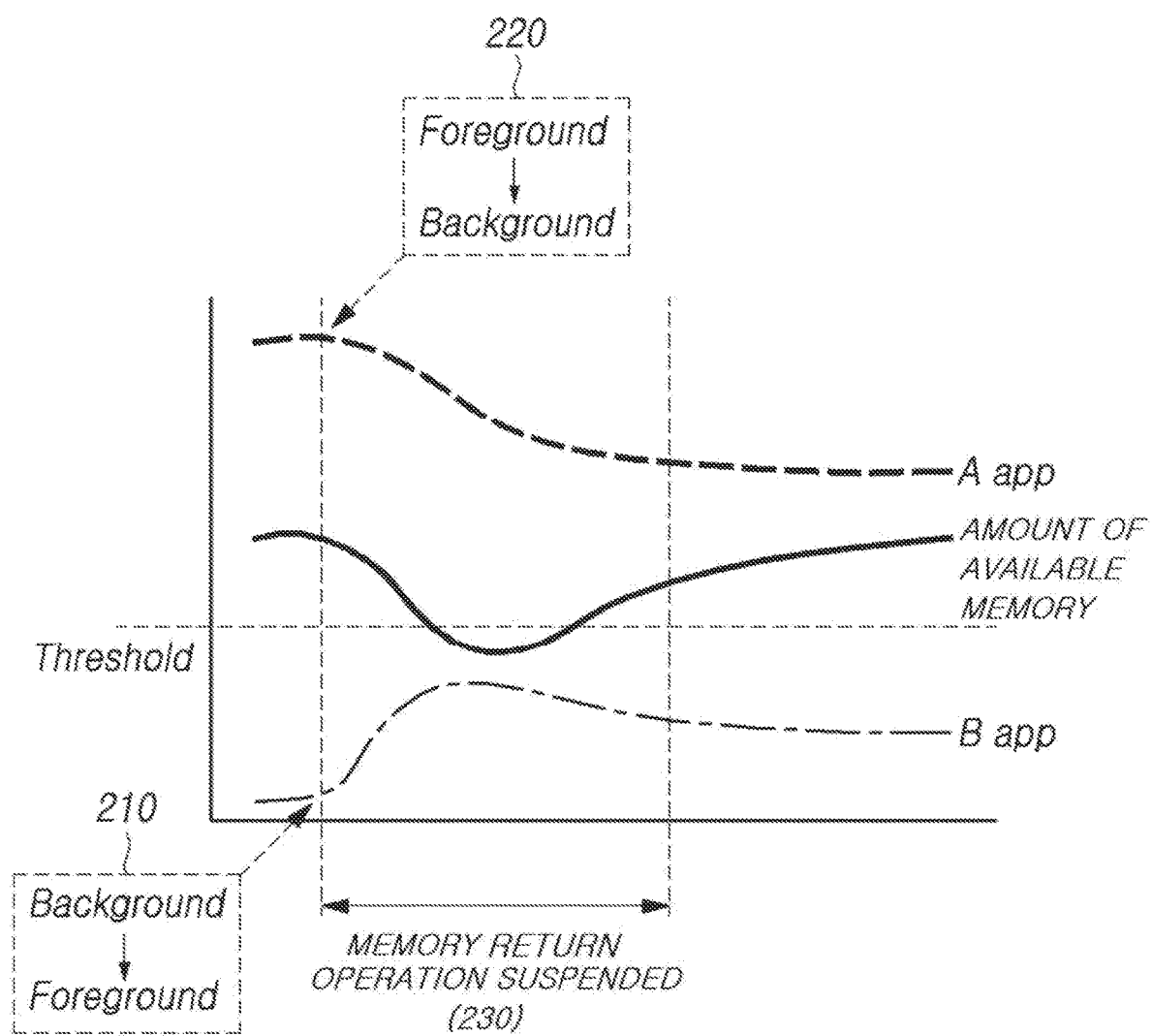
FIG. 2 illustrates an example of an occasion of suspending to execute a memory return operation according to an embodiment of the present disclosure.

FIG. 2 illustrates an example of an occasion of suspending execution of a memory return operation according to an embodiment of the present disclosure.

Referring to FIG. 2, the processor 110 may switch (210) an application B execution process from the background execution to the foreground execution based on an external input. The processor 110 may switch (220) an application A execution process from the foreground execution to the background execution, in response to the foreground execution of the application B execution process.

The processor 110 may predict the amount of required memory indicating the memory required by the foreground execution of the application B execution process, based on the memory usage information 122. The processor 110 may predict the amount of obtained memory indicating the memory that can be obtained by switching from the foreground execution to the background execution of the application A execution process, based on the memory usage information 122. The processor 110 may predict the amount of available memory after an elapse of a predetermined time from the time of switching (210), by adding or subtracting the amount of obtained memory and the amount of required memory to/from the amount of current available memory, respectively. The processor 110 may set the time duration until variability in the memory usage becomes stable, as the predetermined time, or may obtain the predetermined time based on an external input, but it would be apparent to those skilled in the art that the predetermined time may be obtained in various ways.

In the illustrated example in FIG. 2, the predicted amount of available memory in response to the foreground execution of the application B execution process after the predetermined time from the switching (210) exceeds a predetermined threshold value, and accordingly, the processor 110 may suspend (230) execution of the memory return operation for the predetermined time. The predetermined threshold value may be an amount of a reference memory that a system needs to maintain to operate the system normally without falling into an unrecoverable state, and may be pre-set based on an external input, but it would be apparent to those skilled in the art that the predetermined threshold value may be set in various ways. The memory return operation may include operations of selecting a process to return the memory in use based on a predetermined priority and terminating the selected process.

Although not shown herein, for another example, when newly executing a certain process in the foreground, the processor 110 may predict the amount of required memory in response to the foreground execution of the certain process with reference to the memory usage information 122.

Hereinafter, referring to FIG. 3, description will be made to a user interface in a case where for the processor 110 switches an execution state of a process or execute a new process.

Figure 3:
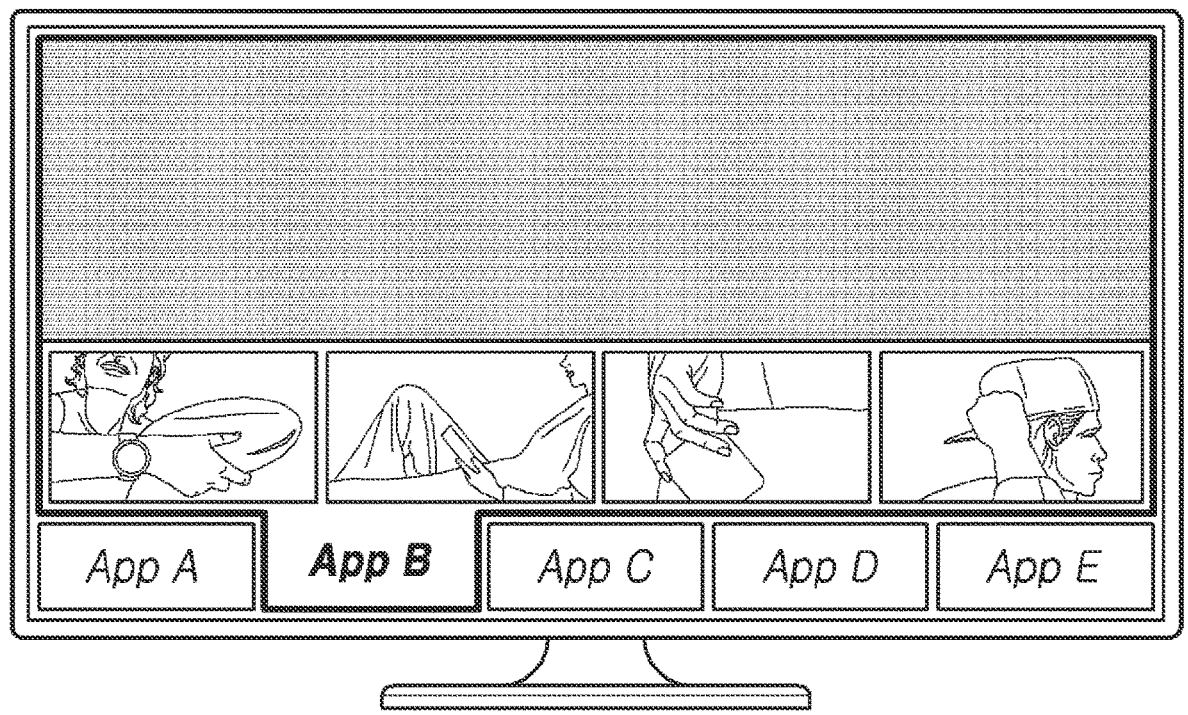
FIG. 3 illustrates an example of a user interface to select an application to execute the application in the foreground according to an embodiment of the present disclosure.

FIG. 3 illustrates an example of the user interface for use in selecting an application to execute in the foreground according to an embodiment of the present disclosure.

Referring now to FIG. 3, the processor 110 may receive an input to execute an application B among a plurality of applications A to E from a user through the user interface.

As described above with reference to FIG. 2, when the input application B is being executed as the background process (210), the processor 110 may switch the execution state of the process corresponding to the application B from the background to the foreground, based on the user input, and output the execution screen of the application B to the display 130.

As another example, when the input application B is not in execution, the processor 110 may newly execute the application B as the foreground process based on the user input and output the execution screen of the application B to the display 130.

Figure 4:
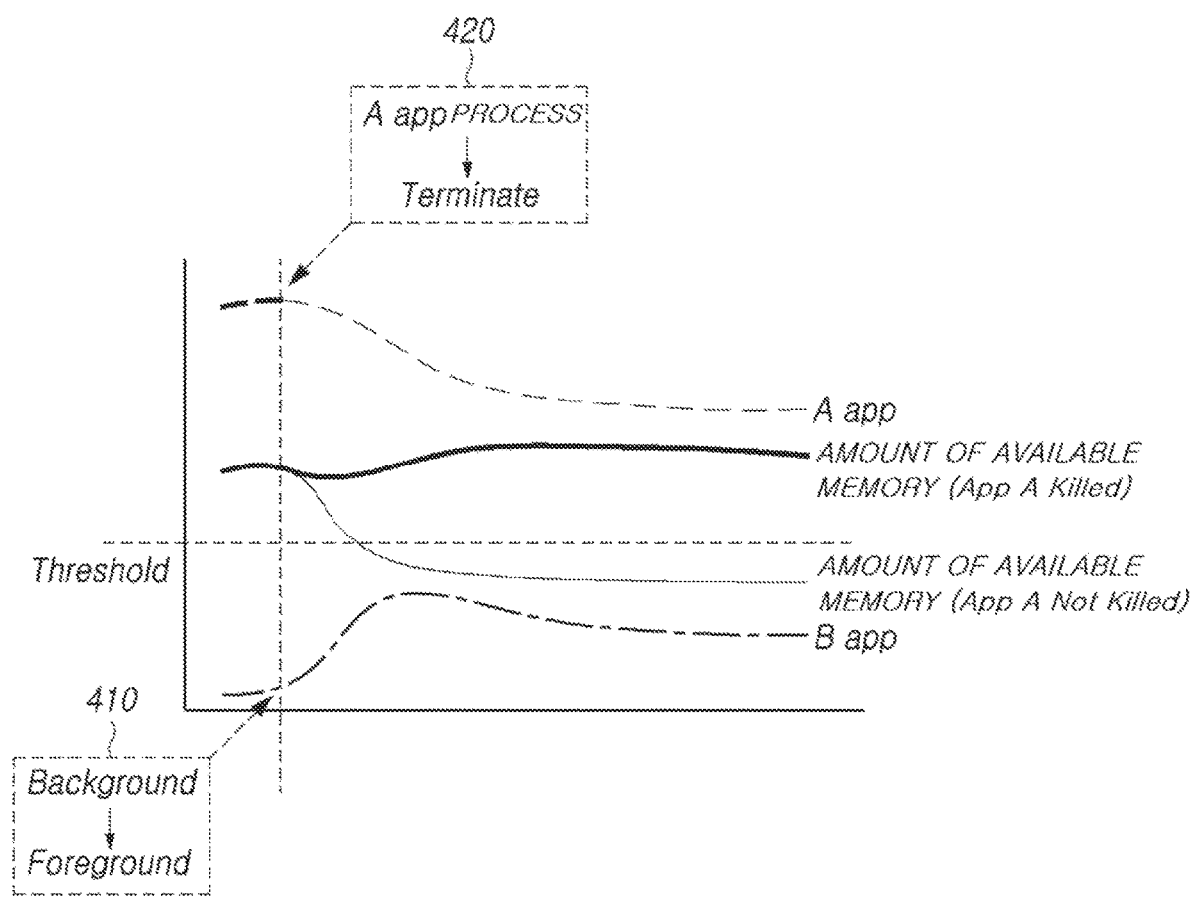
FIG. 4 illustrates an example of an occasion in which a memory return operation is performed according to an embodiment of the present disclosure.

FIG. 4 illustrates an example of a scenario in which the memory return operation is performed according to an embodiment of the present disclosure.

Referring to FIG. 4, the processor 110 may switch (410) the application B execution process from the background execution to the foreground execution, based on an external input. In response to the foreground execution of the application B execution process, the processor 110 may switch the process currently in execution in the foreground from the foreground execution to the background execution.

The processor 110 may predict the amount of required memory indicating the memory required by the foreground execution of the application B execution process, based on the memory usage information 122. The processor 110 may predict the amount of obtained memory indicating the memory that can be obtained by switching to the background execution of the process currently in execution in the foreground, based on the memory usage information 122. The processor 110 may predict the amount of available memory when a predetermined time elapses after the switching (410), by adding or subtracting the amount of obtained memory and the amount of required memory to/from the amount of current available memory, respectively. The processor 110 may set a time duration until the variability in the memory usage become stable, as the predetermined time, or may obtain the predetermined time based on an external input, but it would be apparent to those skilled in the art that the predetermined time may be obtained in various ways.

In the illustrated example in FIG. 4, since the predicted amount of available memory after the predetermined time from the switching (410) in response to the foreground execution of the application B execution process is less than the predetermined threshold value, the processor 110 may perform the memory return operation. The processor 110 may select, based on a predetermined priority, a process to return the memory in use as an application A execution process, and terminate (420) the application A execution process. In the illustrated example, the application A execution process may be the same as or different from the above-described process switched from the foreground execution to the background execution, depending upon a predetermined priority. Criteria for selecting a process to return the memory will be described later with reference to FIG. 5.

FIG. 5 illustrates an example of the criteria for selecting a process to return memory according to an embodiment of the present disclosure.

The processor 110 may select a process to return the memory in use based on the predetermined priority and terminate the selected process. FIG. 5 exemplarily illustrate a plurality of processes including processes A to E that are sorted in the order of the predetermined priority.

Although the predetermined priority may be set based on an external input, it is apparent to those skilled in the art that it may be set in various ways. For example, the predetermined priority may be set in the order of a background application, a previous application, a home application, a service, a perceptible application, a foreground application, a system process, and a native process. The background application may include an application that was previously executed but is not currently active. The previous application may include the most recently used background execution application. The home application may include a launcher application that provides a function of making up a background screen, and the like. The service may include a process to provide services such as e.g., cloud synchronization or upload. The perceptible application may include an application that the user is able to recognize but is not actually executing in the foreground. For example, the perceptible application may include a search window displayed as a relatively small user interface, a music listening application, or the like. The foreground application may include an application that is currently output to the display and is in execution. The native process may include a low-hierarchy process to perform basic operations of the electronic device.

Figure 6:
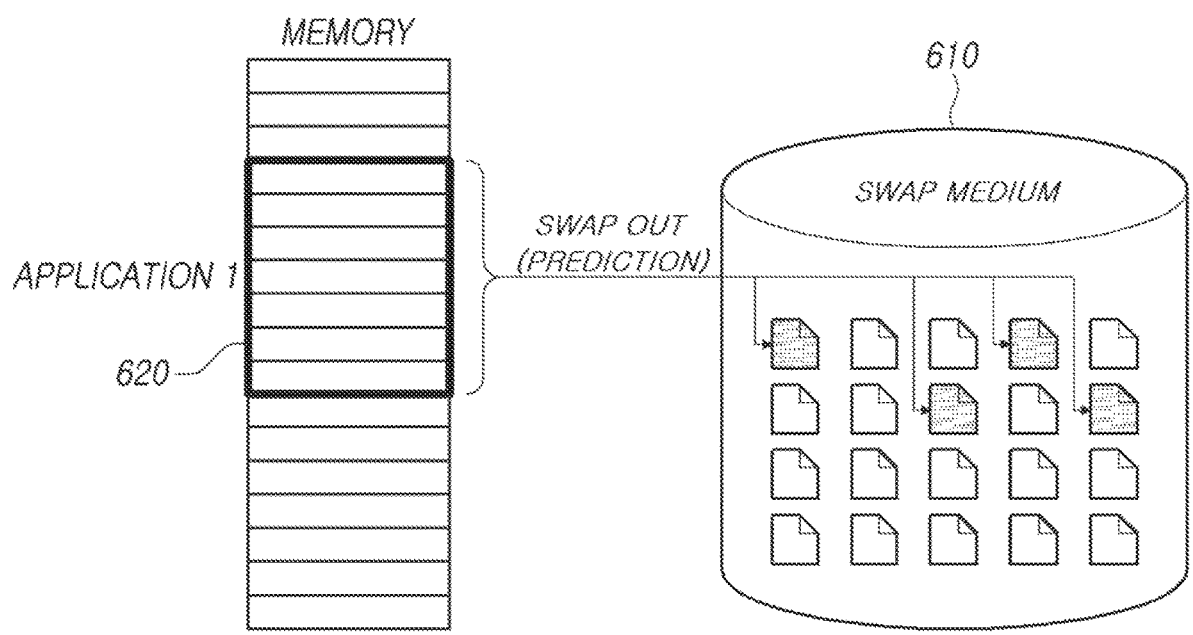
FIG. 6 illustrates an example of a memory return operation according to an embodiment of the present disclosure.

FIG. 6 illustrates an example of the memory return operation according to an embodiment of the present disclosure.

Referring now to FIG. 6, the processor 110 may select a process to return the memory in use based on a predetermined priority, and then predict the amount of a second available memory when swapping out the memory in use to a swap medium 610 without immediately terminating the selected process. In the illustrated example, the processor 110 may select a process corresponding to an application 1 having the lowest priority, and then predict the amount of the second available memory to which the memory 620, corresponding to the application 1, is to be returned when swapping out to the swap medium 610. The processor 110 may determine whether the predicted amount of the second available memory is less than a predetermined threshold value after deducting the predicted amount of required memory, indicating a memory required for execution switching or new execution of a process, from the predicted amount of second available memory, and then terminate the process corresponding to the application 1 when the amount of the second available memory is less than the predetermined threshold value.

With this operation, the processor 110 may terminate the selected process in a preemptive manner when it is predicted that the available memory will not be sufficiently obtained even if the memory 620 used by the selected process is swapped out to the swap medium 610, thereby preventing unnecessary memory reallocation operation, and therefore, preventing unnecessary memory usage of CPU and swap media for selecting reclaimed memory and swapping-out operations.

FIG. 7 is a schematic flowchart of a memory return method according to an embodiment of the present disclosure.

In operation S710, according to an embodiment, in response to the foreground execution of the first process, the electronic device 100 may predict the amount of available memory when a predetermined time has elapsed, based on the memory usage information. The electronic device 100 may set the time duration until variability in memory usage becomes stable, as the predetermined time, or obtain the predetermined time from an external input, but it would be apparent to those skilled in the art that the predetermined time may be obtained in various ways.

The memory usage information 122 may include, for each program, the amount of memory usage corresponding to each execution state of a process executing the program. The execution state of the process may include a foreground execution state that is in execution while being output to the display 130 and a background execution state that is in execution without being output to the display 130. When a process is executed, the electronic device 100 may learn the amount of memory usage corresponding to each execution state of the process, and store memory usage information 122 including the learned amount of memory usage into the memory 120. The processor 110 may learn the amount of memory usage until e.g., the variability in memory usage becomes stable in each of the execution states of the process.

As another example, the memory usage information 122 may include, for each program, memory usage corresponding to an execution state of a process executing the program and an execution context. The execution state of the process may include a foreground execution state that is in execution with being output to the display 130 and a background execution state that is in execution without being output to the display 130. The execution context may include at least one of the amount of available memory at the time of execution and the number of background processes at the time of execution. When executing the process, the electronic device 100 may learn the memory usage corresponding to the execution state of the process and the execution context and store the memory usage information 122 including the learned memory usage in the memory 120. The electronic device 100 may learn the memory usage until the variability in memory usage in each of the execution state of the process and the execution context becomes stable.

The electronic device 100 may switch the second process from the foreground execution to the background execution, in response to the foreground execution of the first process. The electronic device 100 may predict, based on the memory usage information, the amount of obtained memory indicating the memory that can be obtained by the background execution of the second process, predict the amount of required memory indicating the memory required by the foreground execution of the first process, based on the memory usage information, and predict the amount of available memory by adding or subtracting the amount of obtained memory and the amount of required memory to/from the amount of current available memory. The electronic device 100 may predict the amount of available memory by further considering the execution context at the time of foreground execution in response to the foreground execution of the first process.

In operation S720, according to an embodiment, the electronic device 100 may determine whether the predicted amount of available memory exceeds a predetermined threshold value. When it is determined, as a result of the determination, that the amount of available memory exceeds the predetermined threshold value, operation S730 may be performed, while when it is determined that the amount of available memory is less than the predetermined threshold value, operation S740 may be performed.

In the operation S730 according to an embodiment, the electronic device 100 may suspend execution of the memory return operation for the predetermined time.

In the operation S740 according to an embodiment, the electronic device 100 may perform the memory return operation. The memory return operation may select a process to return the memory in use, based on a predetermined priority, and terminate the selected process. Alternatively, the memory return operation may operate to select a process to return the memory in use based on the predetermined priority, predict the amount of the second available memory when swapping out the memory in use by the selected process to a memory swap medium, without terminating the selected process, determine whether the amount of the second available memory exceeds the predetermined threshold value, and terminate the selected process when the amount of the second available memory is less than the predetermined threshold value, as a result of the determination.

The electronic device 100 and the program executed by the electronic device 100 described through the present disclosure may be implemented as hardware components, software components, and/or a combination of the hardware components and the software components. The program may be executed by any system capable of executing computer readable instructions.

The software may include computer programs, codes, instructions, or a combination of one or more of the same, and may configure processing units to operate as required and command the processing units independently or collectively. The software may be implemented as a computer program including instructions stored in a computer-readable storage medium. The computer-readable recording medium may include, for example, a magnetic storage medium (e.g., read-only memory (ROM), random-access memory (RAM), floppy disk, hard disk, and so on) and an optically readable medium (e.g., CD-ROM, Digital Versatile Disc (DVD) and so on). The computer-readable codes in the recording medium may be distributed in between network-connected computer systems, so that the computer-readable codes may be stored and executed in a distributed manner. The recording medium may be readable by a computer, stored in a memory, and executed on a processor.

The machine-readable storage medium may be provided in the form of a non-transitory storage medium, wherein the term "non-transitory" may simply mean that the storage medium is a tangible device, and does not include only a signal (e.g., an electromagnetic wave), but this term does not differentiate between where data is semi-permanently stored in the storage medium and where the data is temporarily stored in the storage medium.

A program according to various embodiments of the disclosure may be included and provided in a computer program product. The computer program product may be traded as a product between a seller and a buyer. The computer program product may include a software program and a machine-readable storage medium in which the software program is stored. The computer program product may include a product (e.g., a downloadable application) in the form of a software program distributed electronically via a manufacturer of a device or an electronic market (e.g., Google PlayStore™, App Store™) or between two user devices (e.g., smart phones) directly. For electronic distribution, at least part of the software program may be stored in a storage medium or may be temporarily generated, wherein the storage medium may be, for example, a server of the manufacturer, a server of the electronic market, or a storage medium of a relay server temporarily storing the software program.

In a system inclusive a server and a device, the computer program product may include a storage medium of the server or a storage medium of the device. Alternatively, when there is a third device (e.g., a smart phone) that is communicatively connected with the server or device, the computer program product may include a storage medium of the third device. Alternatively, the computer program product may include the software program itself transmitted from the server to the device or the third device or transmitted from the third device to the device. In this case, one of a server, a device and a third device may execute the computer program product to perform the method according to example embodiments. Alternatively, two or more of a server, a device, and a third device may execute the computer program product to implement in a distributed manner the method according to the example embodiments. For example, the server may execute a computer program product stored in the server to control a device communicatively connected with the server to perform the method according to the example embodiments. As another example, the third device may execute the computer program product to control the device communicatively connected to the third device to perform the method according to the example embodiment. When the third device executes the computer program product, the third device may download the computer program product from the server and execute the downloaded computer program product. Alternatively, the third device may execute the computer program product provided in a pre-loaded state to perform the method according to the example embodiments.

As described above, although the embodiments have been described with reference to the example embodiments and drawings, various modifications and variations would be possible from the above description by those having ordinary skill in the art. For example, the described techniques may be performed in an order different from the described method, and/or the described components such as e.g., computer systems or modules may be coupled or combined in a different form than the described method, or replace or substituted by other components or equivalents, thereby achieving an appropriate result.

What is claimed is:

1. An electronic device, comprising:
a display;
a memory configured to store at least one instruction corresponding to at least one application program; and
a processor configured to execute the at least one instruction as a process, wherein the processor is configured to:
  perform a foreground execution of a first process, corresponding to a first application program, and concurrently perform a background execution of a second process corresponding to a second application program different from the first application program;
  predict, while the first process is being executed in a foreground, an amount of an available memory at a time point after an elapse of a predetermined time period from the foreground execution of the first process, based on memory usage information stored in the memory;
  based on the predicted amount of the available memory exceeding a predetermined threshold value, suspend a memory return operation for the predetermined time period; and
  based on the predicted amount of the available memory being less than the predetermined threshold value, perform the memory return operation without suspending the memory return operation,
wherein the processor is further configured to:
concurrently to the foreground execution of the first process, switch the second process, previously executed in the foreground, to the background execution;
predict, based on the memory usage information, a first amount of the memory that is obtainable by switching the second process from the foreground execution to the background execution;

predict, based on the memory usage information, a second amount of the memory that is required by the foreground execution of the first process; and predict the amount of the available memory based on an amount of a current available memory, the first amount of the memory, and the second amount of the memory.

2. The electronic device of claim 1, wherein the memory usage information includes, for each of the at least one application program, a memory usage corresponding to an execution state of the process; and wherein the execution state of the process includes a foreground execution state in which the process is in execution while being output to the display and a background execution state in which the process is in execution without being output to the display.

3. The electronic device of claim 1, wherein the memory usage information includes, for each of the at least one application program, a memory usage corresponding to an execution state of the process and an execution context of the process;

wherein the execution state of the process includes a foreground execution state in which the process is in execution while being output to the display and a background execution state in which the process is in execution without being output to the display; and wherein the execution context of the process includes at least one of an amount of an available memory at a time of execution of the process and a number of background processes at the time of execution of the process.

4. The electronic device of claim 3, wherein the processor is further configured to:

learn the memory usage corresponding to the execution state of the process and the execution context of the process, when executing the at least one application program as the process; and store the memory usage information including the learned memory usage in the memory.

5. The electronic device of claim 3, wherein the processor is further configured to, in response to the foreground execution of the first process, predict the amount of the available memory further based on the execution context of the first process at a time of the foreground execution of the first process.

6. The electronic device of claim 1, wherein the processor is further configured to:

set a time to be taken for a variability in a memory usage to become stable, as the predetermined time period; or obtain the predetermined time period from an external input.

7. The electronic device of claim 1, wherein the memory return operation includes:

selecting a process to return a memory in use based on a predetermined priority; and terminating the selected process.

8. The electronic device of claim 1, wherein the memory usage information includes a memory usage until variability in the memory usage becomes stable in each execution state of the first process.

9. The electronic device of claim 1, wherein the processor is further configured to:

learn a memory usage until variability in the memory usage becomes stable in each execution state of the first process; and store the memory usage information including the learned memory usage in the memory.

10. A memory return method, comprising:

performing a foreground execution of a first process, corresponding to a first application program, and concurrently performing a background execution of a second process corresponding to a second application program different from the first application program;

predicting, while the first process is being executed in the foreground, an amount of an available memory at a time point after an elapse of a predetermined time period from the foreground execution of the first process, based on memory usage information;

based on the predicted amount of the available memory exceeding a predetermined threshold value, suspending a memory return operation for the predetermined time period; and based on the predicted amount of the available memory being less than the predetermined threshold value, performing the memory return operation without suspending the memory return operation, wherein the memory return method further comprises:

concurrently to the foreground execution of the first process, switching the second process, previously executed in the foreground, to the background execution, and wherein the predicting the amount of the available memory comprises:

predicting, based on the memory usage information, a first amount of a memory that is obtainable by switching the second process from the foreground execution to the background execution;

predicting, based on the memory usage information, a second amount of the memory that is required by the foreground execution of the first process; and predicting the amount of the available memory an amount of a current available memory, the first amount of the memory, and the second amount of the memory.

11. The memory return method of claim 10, wherein the memory usage information includes, for each of at least one application program stored in a memory and executable as a process, a memory usage corresponding to an execution state of the process; and wherein the execution state of the process includes a foreground execution state in which the process is in execution while being output to a display and a background execution state in which the process is in execution without being output to the display.

12. The memory return method of claim 10, wherein the memory usage information includes, for each of at least one application program stored in a memory and executable as a process, a memory usage corresponding to an execution state of the process and an execution context of the process;

wherein the execution state of the process includes a foreground execution state in which the process is in execution while being output to a display and a background execution state in which the process is in execution without being output to the display; and wherein the execution context of the process includes at least one of an amount of an available memory at a time of execution of the process and a number of background processes at the time of execution of the process.

13. The memory return method of claim 12, further comprising:

learning the memory usage corresponding to the execution state of the process and the execution context of the process, when executing the at least one application program as the process; and storing the memory usage information including the learned memory usage in the memory.

14. The memory return method of claim 12, wherein the predicting the amount of the available memory comprises predicting, in response to the foreground execution of the first process, the amount of the available memory further based on the execution context of the first process at a time of the foreground execution of the first process.

15. The memory return method of claim 10, further comprising:
- setting a time to be taken for a variability in a memory usage to become stable, as the predetermined time period; or
- obtaining the predetermined time period from an external input.

16. The memory return method of claim 10, wherein the memory return operation comprises:
- selecting a process to return a memory in use based on a predetermined priority; and
- terminating the selected process.

17. The memory return method of claim 10, wherein the memory usage information includes a memory usage until variability in the memory usage becomes stable in each execution state of the first process.

18. The memory return method of claim 10, further comprising:
- learning a memory usage until variability in the memory usage becomes stable in each execution state of the first process; and
- storing the memory usage information including the learned memory usage in the memory.

* * * * *